United States Patent
Nishigaya et al.

(10) Patent No.: US 6,565,465 B2
(45) Date of Patent: May 20, 2003

(54) CONTINUOUSLY VARIABLE BELT TRANSMISSION

(75) Inventors: Masabumi Nishigaya, Toyota (JP); Shinya Kuwabara, Toyota (JP); Masami Sugaya, Susono (JP); Shinji Kasuga, Anjo (JP); Shoichi Sayo, Toyota (JP); Hiroshi Morioka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 55 days.

(21) Appl. No.: 09/858,488

(22) Filed: May 17, 2001

(65) Prior Publication Data

US 2001/0044350 A1 Nov. 22, 2001

(30) Foreign Application Priority Data

May 17, 2000 (JP) .......................... 2000-145310

(51) Int. Cl.[7] .......................... F16H 59/00; F16H 61/00; F16H 63/00
(52) U.S. Cl. .......................... 474/28; 474/18
(58) Field of Search .............................. 474/28, 18, 46, 474/70, 69, 91; 477/45–48

(56) References Cited

U.S. PATENT DOCUMENTS

| 5,032,108 A | * | 7/1991 | Taniguchi et al. | 474/28 |
| 5,221,235 A | * | 6/1993 | Ogawa | 474/25 |
| 5,427,578 A | * | 6/1995 | Iijima | 474/18 |
| 6,015,359 A | * | 1/2000 | Kunii | 474/18 |
| 6,171,207 B1 | * | 1/2001 | Ehrlich et al. | 474/18 |

FOREIGN PATENT DOCUMENTS

| EP | 419101 A1 | * | 3/1991 |
| JP | 64-41757 | | 3/1989 |
| JP | 2-38555 | | 3/1990 |

\* cited by examiner

*Primary Examiner*—Marcus Charles
(74) *Attorney, Agent, or Firm*—Oblon, Spivak, McClelland, Maier & Neustadt, P.C.

(57) ABSTRACT

The continuously variable belt transmission is provided with a fixed sheave and a movable sheave provided on a secondary shaft, a first hydraulic chamber that presses the movable sheave in an axial direction, a second hydraulic chamber that gives the movable sheave a pressing force acting in a direction opposite the pressing force given by the first hydraulic chamber, an oil passage connected to the second hydraulic chamber, and an oil receiver disposed along a path from the oil passage to the second hydraulic chamber. The oil receiver is attached to the secondary shaft, a bearing and a bulkhead are disposed on both sides of the oil receiver, an oil passage is provided in the secondary shaft, and a grooved portion provided in the oil receiver connects the second hydraulic chamber and the oil passage.

7 Claims, 7 Drawing Sheets

CONTINUOUSLY VARIABLE BELT TRANSMISSION

INCORPORATION BY REFERENCE

The disclosure of Japanese Patent Application No. 2000-145310 filed on May 17, 2000, including the specification, drawings and abstract, is incorporated herein by reference in its entirety.

BACKGROUND OF THE INVENTION

1. Field of the Invention

This invention relates to a continuously variable belt transmission that uses a belt to transmit motive force between two rotary members and, at the same time, controls their gear ratio by changing a winding radius of the belt.

2. Discussion of the Related Art

Generally speaking, a transmission is provided on the output side of an engine with the aim of running the engine in an optimum condition according to vehicle operating conditions. There are two types of such a transmission: a continuously variable transmission that is capable of controlling the gear ratio in a stepless fashion (infinitely variable), and a step variable transmission that can control the gear ratio in several steps (non-continuously). A continuously variable belt transmission is one example of a continuously variable transmission. The continuously variable belt transmission comprises two rotary members disposed in parallel with each other, and a primary pulley and a secondary pulley attached to each of these two rotary members. Each of the primary pulley and the secondary pulley is made up of a combination of a fixed sheave and a movable sheave, and a V-shaped groove is formed between the fixed sheave and the movable sheave.

A belt is wound around the groove in the primary pulley and the groove in the secondary pulley. Hydraulic chambers are provided, each independently generating a pressing force acting in an axial direction on a belt supporting member of the primary pulley and a belt supporting member of the secondary pulley. When the hydraulic pressure of each hydraulic chamber is independently controlled, the width of the groove in the primary pulley is controlled to vary the winding radius of the belt, thus changing its gear ratio. Meanwhile, the width of the groove in the secondary pulley is changed such that the tension in the belt is controlled.

In a continuously variable belt transmission such as that described above, the hydraulic chambers are provided on an outer peripheral side of the rotary members. This could cause an oil pressure generated from a centrifugal force, or what is called the centrifugal hydraulic pressure, to act on the hydraulic chambers, making the hydraulic pressures in the hydraulic chambers higher than the controlled target levels. This results in control accuracy of the groove width supporting the belt being degraded. Japanese Utility Model Publication HEI 02-38555 describes related art pertinent to a continuously variable belt transmission that can solve such a problem.

In the continuously variable belt transmission disclosed in this publication, a secondary pulley (power transmitting member) provided on a secondary shaft (rotary member) is provided with a fixed sheave formed integrally on the secondary shaft and a movable sheave attached movably in the axial direction to the secondary shaft. A cylindrical member that extends in an axial direction toward a side opposite the fixed sheave is formed on the movable sheave. An annular cylinder plate is fixed in position so as not to be movable in the axial direction on an outer periphery of the secondary shaft. An inner peripheral surface of the cylindrical member and an outer peripheral surface of the cylinder plate are in slidable contact with each other, and a first hydraulic chamber is formed between the cylinder plate and the movable sheave. An annular wall is provided on the inner periphery of the cylindrical member and a second hydraulic chamber is formed between the cylinder plate and the annular wall.

In addition, a receiver (oil passage forming member) of cylindrical shape extending in the axial direction toward the cylinder plate side is formed in a rear case that retains the secondary shaft through a bearing. A connecting oil passage is formed between the receiver and a face in the cylinder plate on a side opposite the side of the first hydraulic chamber. The connecting oil passage connects an oil passage provided in the rear case and the second hydraulic chamber.

In a continuously variable belt transmission constructed as described above, a centrifugal hydraulic pressure acts on the first hydraulic chamber while the hydraulic pressure in the first hydraulic chamber is being controlled and, even if the hydraulic pressure in the first hydraulic chamber becomes higher than a target pressure level, a centrifugal hydraulic pressure corresponding to that centrifugal hydraulic pressure acts on the second hydraulic chamber. As a result, the centrifugal hydraulic pressure acting on the first hydraulic chamber and the hydraulic pressure acting on the second hydraulic chamber cancel each other out, which enhances the control accuracy of the groove width of the secondary pulley.

In the continuously variable belt transmission described in above-mentioned publication, the oil passage formed in the rear case and the receiver, which forms a connecting oil passage, is formed on the side of the rear case. For reasons of design and positional relationship, however, it is possible for the oil passage to be formed on the secondary shaft side, the oil passage forming member to be installed on the secondary shaft side, and parts to be installed on both sides of the oil passage forming member in the axial direction. If such a configuration or layout is adopted, the parts disposed on both sides of the oil passage forming member would interfere in the forming of a connecting oil passage for connecting the oil passage of the secondary shaft and the second hydraulic chamber, making the forming thereof difficult. If a new oil passage is disposed so as to bypass the parts on both sides of the oil passage forming member, a new part for bypassing must be provided, thus increasing the number of parts used and requiring more space for mounting parts on the secondary shaft in an axial direction, which may result in vehicle mountability being degraded.

SUMMARY OF THE INVENTION

In view of the foregoing problems, it is an object of this invention to provide a continuously variable belt transmission that can supply oil from the side of a rotary member by using an oil passage forming member, without newly installing parts other than oil passage forming parts.

To achieve the foregoing object, a continuously variable belt transmission according to a first embodiment of the invention is provided with a power transmitting member provided on a rotary member, a belt wound around the power transmitting member, a first hydraulic chamber that gives the power transmitting member a holding force to hold the belt in an axial direction of the power transmitting member, a second hydraulic chamber that gives the power transmitting member a force in a direction so as to weaken the holding force, an oil passage through which hydraulic pressure is supplied to the second hydraulic chamber, and an oil passage forming member that is disposed along a path from this oil passage to the second hydraulic chamber. The oil passage forming member is attached to the rotary member, parts disposed on both sides of the oil passage forming member in the axial direction are installed on the rotary member, and the oil passage is provided on the rotary member. In addition, the second hydraulic chamber is connected to the oil passage through a grooved portion provided in the oil passage forming member.

According to a first embodiment, the grooved portion provided in the oil passage forming member itself connects the oil passage and the second hydraulic chamber. This obviates the need for providing a part for exclusive use in connecting the oil passage and the second hydraulic chamber. It further makes it possible to form the grooved portion so as to bypass the parts provided on both sides in the axial direction of the oil passage forming member. The grooved portion in this embodiment may include a cutout portion and a recessed portion.

A continuously variable belt transmission according to a second embodiment of the invention is provided with a belt wound around a rotary member, an oil chamber provided in an area surrounding the rotary member, a bulkhead attached to the rotary member and disposed so as to face the oil chamber, and an oil passage connected to the oil chamber. An oil passage forming member is installed in a space between bearings retaining this rotary member and the bulkhead on an outer periphery of the rotary member. A grooved portion provided in the oil passage forming member constitutes the oil passage.

According to the second embodiment, the oil passage connected to the oil chamber is formed by the grooved portion provided in the oil passage forming member itself. This obviates the need for providing a new part for exclusive use in forming the oil passage. It is also possible to form the oil passage bypassing the bulkhead and bearing. The grooved portion in this embodiment may include a cutout portion and a recessed portion.

DETAILED DESCRIPTION OF THE PREFERRED EMBODIMENTS

Figure 2:
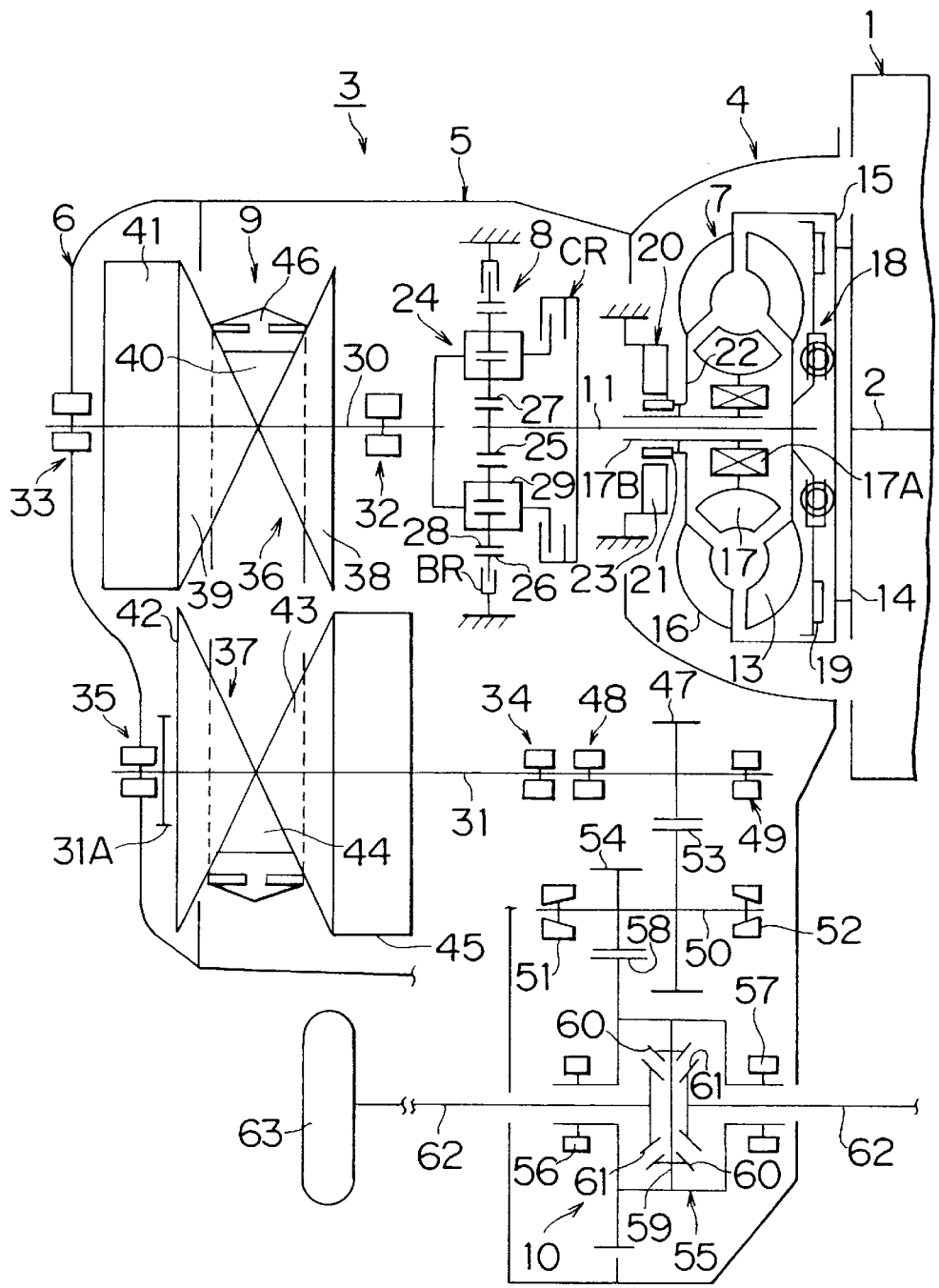
FIG. 2 is a skeleton diagram showing a power transmission path in a front-engine, front-drive vehicle to which this invention is applied.

The preferred embodiments of the invention will hereinafter be described in detail with reference to the attached drawings. FIG. 2 is a skeleton diagram showing a front-engine, front-drive vehicle to which this invention is applied. Referring to FIG. 2, an engine 1 is installed as a power source for a vehicle. An internal combustion engine, more particularly a gasoline engine, diesel engine, or an LPG engine, may be used as the engine 1. A crankshaft 2 of the engine 1 is disposed in the width direction of the vehicle. For the sake of convenience, the following description assumes that a gasoline engine is used as the engine 1.

A transaxle 3 is provided on the output side of the engine 1. The transaxle 3 has a transaxle housing 4, a transaxle case 5, and a transaxle cover 6. The transaxle housing 4 is attached to the rear end of the engine 1. The transaxle case 5 is mounted on the end of an opening in the transaxle housing 4 opposite the engine 1. The transaxle cover 6 is mounted on the end of an opening in the transaxle case 5 opposite the transaxle housing 4.

A torque converter 7 is provided inside the transaxle housing 4. A forward-reverse selection mechanism 8, continuously variable belt transmission (CVT) 9, and a final reduction gear (in other words, a differential gear system) 10 are provided inside the transaxle case 6 and the transaxle rear cover 6. The construction of the torque converter 7 will first be described. An input shaft 11 that can rotate about the same axis as the crankshaft 2 is provided in the transaxle housing 4. A turbine runner 13 is mounted on the end of the input shaft 11 on the side of the engine 1.

A front cover 15 is communicated via a drive plate 14 to the rear end of the crankshaft 2 and a pump impeller 15 is connected to the front cover 15. The turbine runner 13 and the pump impeller 16 are disposed opposing one another and a stator 17 is provided inside the turbine runner 13 and the pump impeller 16. A hollow shaft 17B is connected by way of a one-way clutch 17A to the stator 17. The input shaft 11 runs through this hollow shaft 17B. A lockup clutch 19 is provided via a damper mechanism 18 on the end of the input shaft 11 on the side of the front cover 15. Oil as a hydraulic fluid is supplied to the inside of a casing (not shown) formed by the front cover 15, pump impeller 16, and other components as noted above.

With this configuration, power (torque) from the engine 1 is transmitted through the crankshaft 2 to the front cover 15. If the lockup clutch 19 is disengaged at this time, torque of the pump impeller 16 is transmitted to the turbine runner 13 and then to the input shaft 11 through the fluid. The torque transmitted from the pump impeller 16 to the turbine runner 13 may be amplified by the stator 17. On the other hand, if the lockup clutch 19 is engaged at this time, the torque of the front cover 15 is mechanically transmitted to the input shaft 11.

An oil pump 20 is provided between the torque converter 7 and the forward-reverse selection mechanism 8. A rotor 21 of the oil pump 20 and the pump impeller 16 are connected by a hub 22 of cylindrical shape. A body 23 of the oil pump 20 is secured to a side of the transaxle case 5. The hub 22 and the hollow shaft 17B are in splined engagement with each other. This configuration allows power from the engine 1 to be transmitted via the pump impeller 16 to the rotor 21, thus driving the oil pump 20.

The forward-reverse selection mechanism 8 is provided along a power transmission path between the input shaft 11 and the continuously variable belt transmission 9. The forward-reverse selection mechanism 8 is provided with a planetary gear mechanism 24 of a double-pinion type. The planetary gear mechanism 24 comprises a sun gear 25 provided on the end of the input shaft 11 on the side of the continuously variable belt transmission 9, a ring gear 26 disposed concentrically with the sun gear 25 on an outer peripheral side of the sun gear 25, a pinion gear 27 that is meshed with the sun gear 25, a pinion gear 28 that is meshed with the pinion gear 27 and the ring gear 26, and a carrier 29 which rotatably retains the pinion gears 27 and 28, as well as retaining the pinion gears 27 and 28 so that they can rotate integrally around the sun gear 25. The carrier 29 is connected to a primary shaft (to be described later) of the input shaft 11. In addition, a forward clutch CR, which connects and disconnects a power transmission path between the carrier 29 and the input shaft 11, is provided. Further, a reverse brake BR, which controls rotation and lockup of the ring gear 26, is provided on a side of the transaxle case 5.

The continuously variable belt transmission 9 is provided with a primary shaft 30 disposed concentrically with the input shaft 11 (in other words, a shaft on a drive side) and a secondary shaft 31 disposed in parallel with the primary shaft 30 (in other words, a countershaft or a shaft on a driven side). Bearings 32 and 33 retain the primary shaft 30 rotatably, and bearings 34 and 35 rotatably retain the secondary shaft 31.

The primary shaft 30 is provided with a primary pulley 36 and the secondary shaft 31 is provided with a secondary pulley 37. The primary pulley 36 is provided with a fixed sheave 38 (in other words, a fixed member) formed integrally with the primary shaft 30 on its periphery and a movable sheave 39 (in other words, a movable member) configured so as to be movable in an axial direction of the primary shaft 30. A V-shaped groove 40 is formed between opposing faces of the fixed sheave 38 and the movable sheave 39.

Furthermore, a hydraulic actuator 41 (in other words, a hydraulic servo mechanism) that causes the movable sheave 39 to approach and separate from the fixed sheave 38 by moving the movable sheave 39 in the axial direction of the primary shaft 30 is provided. Meanwhile, the secondary pulley 37 is provided with a fixed sheave 42 (in other words, a fixed member) formed integrally with the secondary shaft 31 on the periphery thereof and a movable sheave 43 (in other words, a movable member) configured so as to be movable in an axial direction of the secondary shaft 31. A V-shaped groove 44 is formed between opposing faces of the fixed sheave 42 and the movable sheave 43. In addition, a hydraulic actuator 45 (in other words, a hydraulic servo mechanism) that causes the movable sheave 43 to approach and separate from the fixed sheave 42 by moving the movable sheave 43 in the axial direction of the secondary shaft 31 is provided.

A belt 46 is wound around the groove 40 of the primary pulley 36 and the groove 44 of the secondary pulley 37. The belt 46 is provided with multiple metal blocks and a plurality of steel rings. A counter driven gear 47 of a cylindrical shape is secured to the secondary shaft 31 on the side of the engine 1 and the counter driven gear 47 is retained by bearings 48 and 49. The bearing 35 is provided on the side of the transaxle rear cover 6 and a parking gear 31A is provided on the secondary shaft 31 between the bearing 35 and the secondary pulley 37.

An intermediate shaft 50 that is parallel with the secondary shaft 31 is provided along a power transmission path between the counter driven gear 47 and the final reduction gear 10 of the continuously variable belt transmission 9. The intermediate shaft 50 is supported by bearings 51 and 52. A counter driven gear 53 and a final drive gear 54 are formed on the intermediate shaft 50. The counter drive gear 47 is meshed with the counter driven gear 53.

The final reduction gear 10 is provided with a hollow differential case 55. The differential case 55 is rotatably retained by bearings 56 and 57 and a ring gear 58 is provided on an outer periphery of the differential case 55. The final drive gear 54 is meshed with the ring gear 58. A pinion shaft 59 is mounted inside the differential case 55 and two pinion gears 60 are mounted on the pinion shaft 59. Two side gears 61 are meshed with these pinion gears 60. A front drive shaft 62 is connected independently to each of the two side gears 61 and a wheel (front wheel) 63 is connected to each of these front drive shafts 62.

Figure 3:
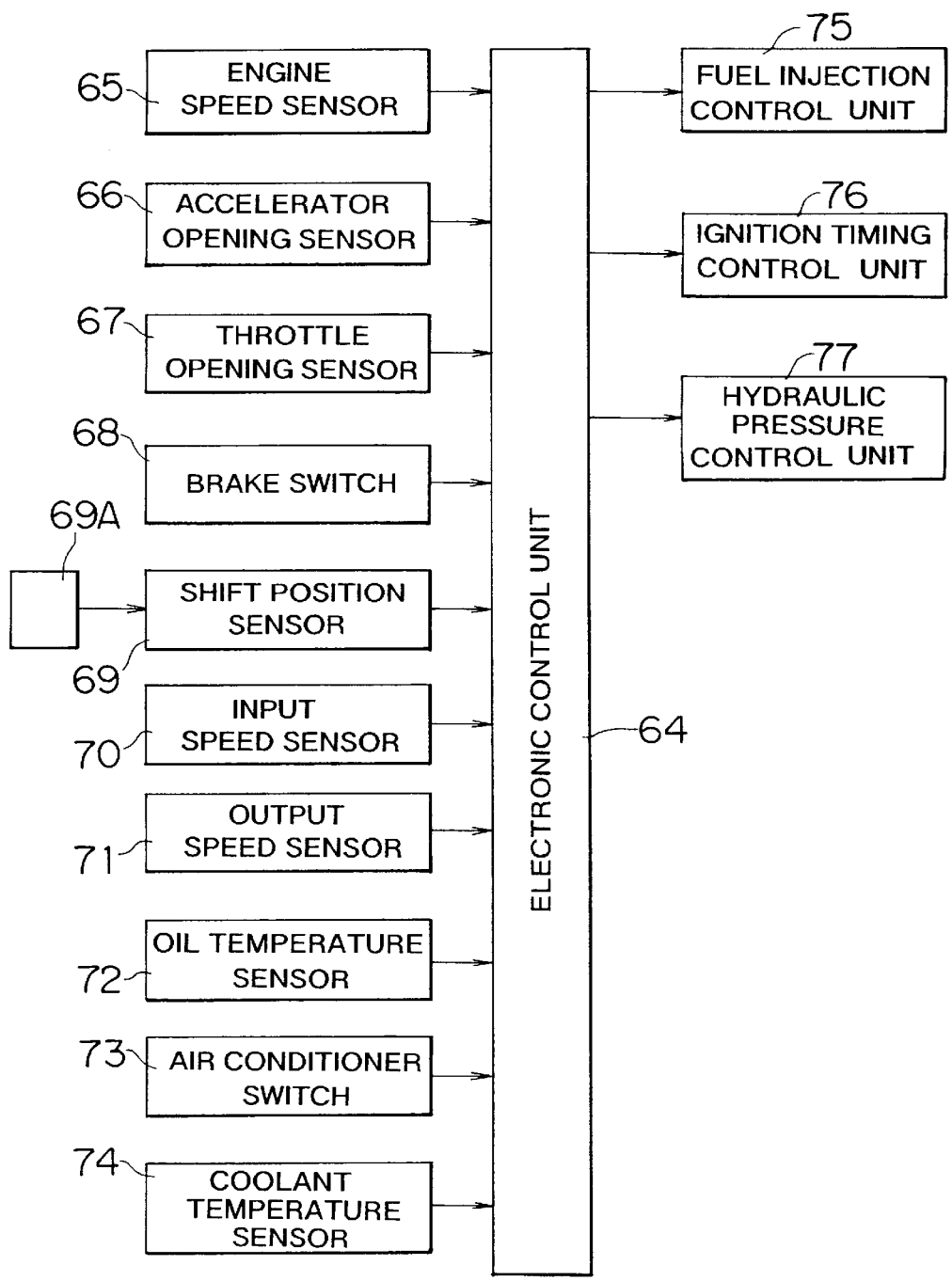
FIG. 3 is a block diagram showing a control system of the vehicle shown in FIG. 2.

FIG. 3 is a block diagram showing a control system of the vehicle shown in FIG. 2. An electronic control unit 64 that controls the entire vehicle is made up of a microprocessor comprising mainly a computer processing unit (CPU or MPU), storage devices (RAM and ROM), and an I/O interface.

Signals are input to this electronic control unit 64 from such devices as an engine speed sensor 65, an accelerator opening sensor 66, a throttle opening sensor 67, a brake switch 68, a shift position sensor 69 that detects the operating condition of a shift position selection unit 69A, an input speed sensor 70 that detects the input speed of the continuously variable belt transmission 9, an output speed sensor 71 that detects the output speed of the continuously variable belt transmission 9, an oil temperature sensor 72 that detects the hydraulic fluid temperature of the continuously variable belt transmission 9 and the torque converter 7, an air conditioner switch 73, and a coolant temperature sensor 74 that detects coolant temperature of the engine 1.

The signal fed from the shift position sensor 69 is used to determine which is selected, either a drive position [for example, D (drive) position, R (reverse) position, etc.] or a non-drive position [for example, N (neutral) position, P (park) position, etc.]. It is further used to determine which of the two drive positions, either a forward position (for example, D position) or a reverse position (R position), is selected. Furthermore, a vehicle speed and a gear ratio of the continuously variable belt transmission 9 can be calculated by using a signal from the engine speed sensor 65, a signal from the input speed sensor 70, and a signal from the output speed sensor 71 and the like.

A signal that controls a fuel injection control unit 75 of the engine 1, and a signal that controls an ignition timing control unit 76 and a signal that controls a hydraulic pressure control unit 77 of the engine 1 are output from the electronic control unit 64. The hydraulic pressure control unit 77 is provided with a solenoid valve (not shown) that controls engagement and disengagement of the lockup clutch 19, a solenoid valve (not shown) that controls the hydraulic pressure of hydraulic chambers of the hydraulic actuators 41 and 45, a solenoid valve (not shown) that controls the hydraulic pressure acting on the forward clutch CR and reverse brake BR, a hydraulic circuit and so forth.

Data used for providing a transmission control of the engine 1, lockup clutch 19, and the continuously variable belt transmission 9 based on the various signals are stored in the electronic control unit 64. For example, the electronic control unit 64 stores data, with which an optimum operating condition of the engine 1 is selected by controlling the gear ratio of the continuously variable belt transmission 9 based on the accelerator opening, vehicle speed, and other vehicle operating conditions. The electronic control unit 64 also stores a lockup clutch control map having the accelerator opening and vehicle speed as parameters. The lockup clutch 19 is controlled through each state of engagement, disengagement and slip, based on this lockup clutch control map. The electronic control unit 64 outputs control signals to the fuel injection control unit 75, the ignition timing control unit 76, and the hydraulic pressure control unit 77 based on the various signals input to the electronic control unit 64 and the data stored in the electronic control unit 64.

Figure 1:
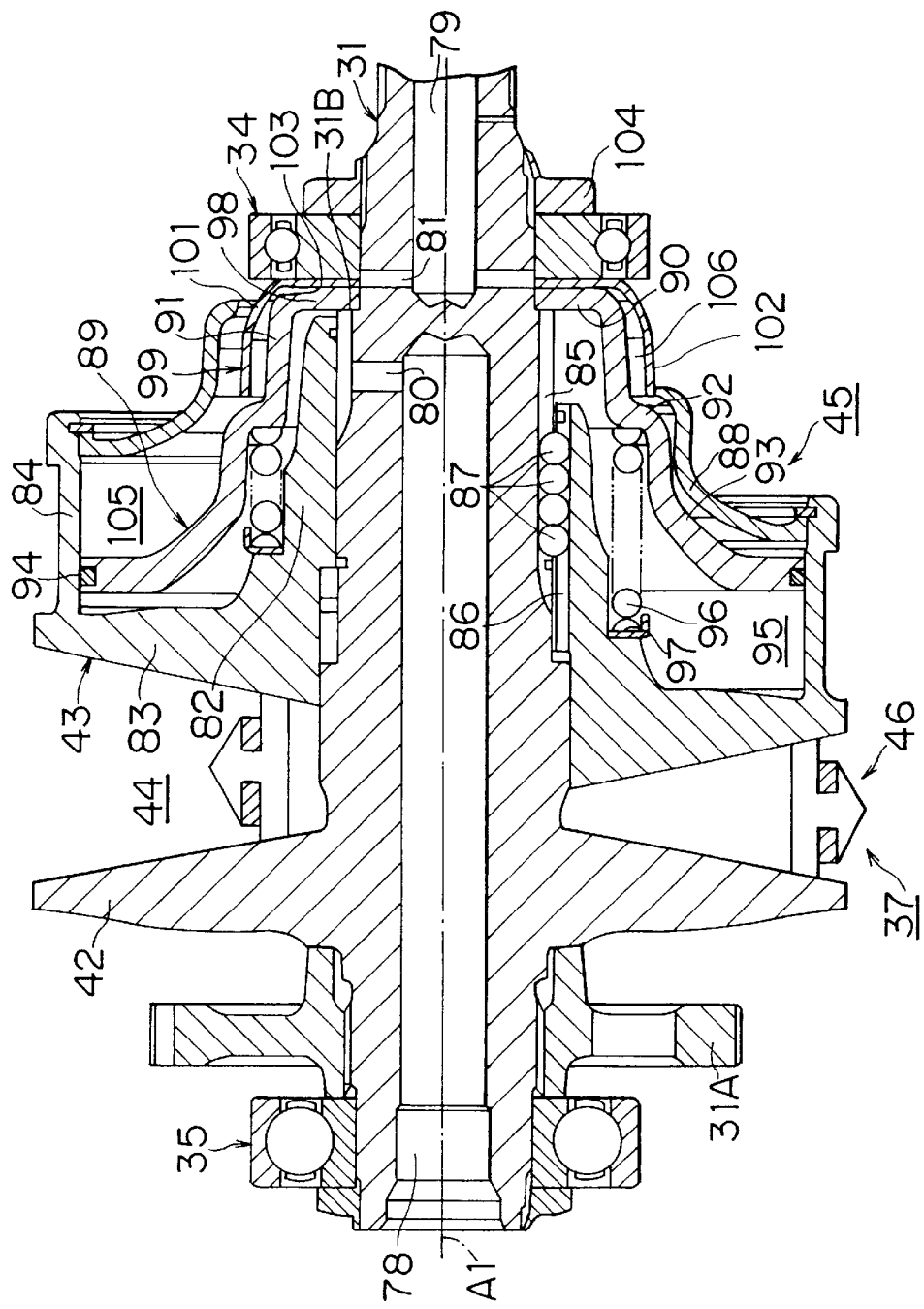
FIG. 1 is a front sectional view showing the construction of the area near the secondary pulley of the continuously variable belt transmission according to this invention.

FIG. 1 is a sectional view showing the detailed construction of the area near the secondary shaft 31. In FIG. 1, the upper portion above an axis A1 shows the conditions of the hydraulic actuator 45 and the movable sheave 43 corresponding to a case in which a hydraulic pressure is discharged from a first hydraulic chamber 95, while the lower portion below the axis A1 shows the conditions of the hydraulic actuator 45 and the movable sheave 43 corresponding to a case in which a hydraulic pressure is supplied to the first hydraulic chamber 95.

The secondary pulley 37 is disposed on an outer periphery of the secondary shaft 31 between the bearing 34 and the bearing 35. The secondary shaft 31 is rotatable about the axis A1, and two oil passages 78 and 79 are formed inside the secondary shaft 31 in an axial direction. These oil passages 78 and 79 are connected to the hydraulic circuit of the hydraulic pressure control unit 77. In addition, there is an oil passage 80 which extends radially from the outer peripheral surface of the secondary shaft 31 and which is connected to the oil passage 78. There is also an oil passage 81 which extends radially from the outer peripheral surface of the secondary shaft 31 and which is connected to the oil passage 79. A stepped portion 31B is formed between an opening in the oil passage 80 and an opening of the oil passage 81 on the outer periphery of the secondary shaft 31. The stepped portion 31B is constructed so as to face the bearing 34.

The movable sheave 43 of the secondary pulley 37 is provided with an inner cylindrical portion 82, a radial portion 83 that is continued to an end portion on the side of the fixed sheave 42 on an outer periphery of the inner cylindrical portion 82, and an outer cylindrical portion 84 which is continued to the side of an outer periphery of the radial portion 83 and which is extended in an axial direction toward the side of the bearing 35. A groove 86 is formed in an inner peripheral surface of the inner cylindrical portion 82 in an axial direction and a groove 85 is formed in an outer peripheral surface of the secondary shaft 31 in an axial direction. A plurality of these grooves 85 and 86 are formed at predetermined intervals along a circumferential direction. The secondary shaft 31 and the movable sheave 43 are positioned so that each of the grooves 85 and each of the grooves 86 are respectively in phase with each other along the circumferential direction. A plurality of balls 87 are placed to run through both of the grooves 85 and 86. The grooves 85 and 86, and the balls 87, allow the secondary shaft 31 and the movable sheave 43 relatively move in an axial direction, while preventing the secondary shaft 31 and the movable sheave 43 from relatively moving in a circumferential direction.

An annular balance plate 88 is secured to an end on the side of the bearing 34 on an inner periphery of the outer cylindrical portion 84. The balance plate 88 is provided with a first section that extends inwardly from the inner peripheral side of the outer cylindrical portion 84, a second section that is curved from the first section toward the side of the bearing 34, and a third section that extends in an axial direction from the second section toward the side of the bearing 34. An annular bulkhead 89 is provided in an annular space enclosed by the movable sheave 43 and the balance plate 88.

Figure 4:
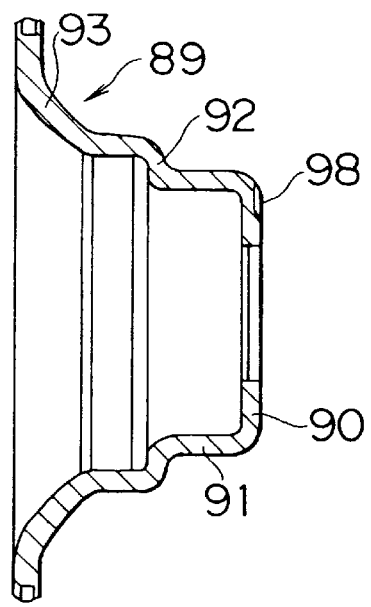
FIG. 4 is a front sectional view showing a bulkhead that forms part of the hydraulic actuator on the side of the secondary pulley shown in FIG. 1.
Figure 5:
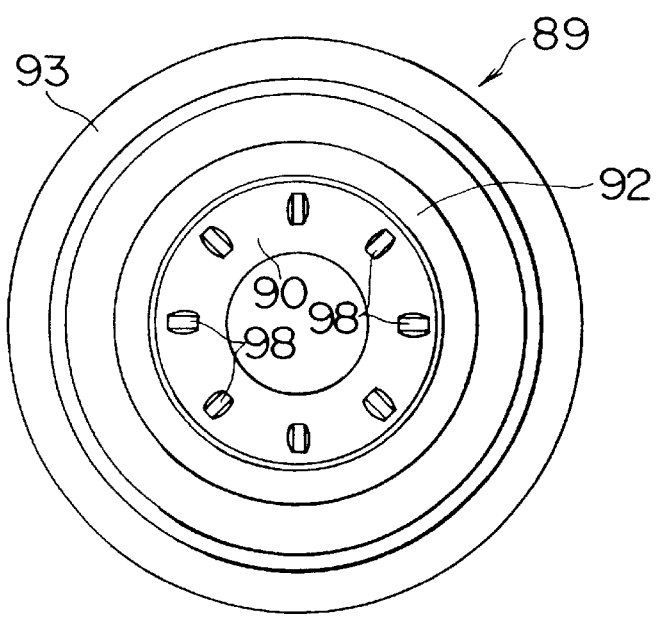
FIG. 5 is a side view showing the bulkhead shown in FIG. 4.

FIG. 4 is a sectional view of the bulkhead 89 and FIG. 5 is a side view of the bulkhead 89. The bulkhead 89 is provided with a radial portion 90, a cylindrical portion 91 that extends from an outer peripheral end of the radial portion 90 toward the side of the radial portion 83, a radial portion 92 that extends outwardly from an end portion of the cylindrical portion 91 on the side of the radial portion 83, and a curved portion 93 which is continued to an outer peripheral side of the radial portion 92 and which is curved in a direction protruding toward the radial portion 83. The radial portion 90 that forms an inner peripheral end of the bulkhead 89 is disposed between the stepped portion 31B and the bearing 34. More specifically, it is disposed between the stepped portion 31B and the opening in the oil passage 81. A plastic seal ring 94 is fitted to the outer peripheral end of the bulkhead 89. The seal ring 94 makes contact with an inner peripheral surface of the outer cylindrical portion 84 of the movable sheave 43 in a state in which relative movement is possible in an axial direction and a sealing surface is formed at the portion of contact.

The first hydraulic chamber 95 is formed in this manner in a space enclosed by the movable sheave 43 and the bulkhead 89. The first hydraulic chamber 95 and the oil passage 80 are connected to each other. A compression coil spring 96 is disposed inside the first hydraulic chamber 95. One end of the compression coil spring 96 makes contact with the radial portion 92 of the bulkhead 89, while the other end of the compression coil spring 96 makes contact with the stepped portion 97 of the movable sheave 83. A plurality of grooves 98 are formed at predetermined intervals along a circumferential direction in a side face of the radial portion 90 of the bulkhead 89 on the side of the bearing 34 as shown in FIG. 5.

Figure 6:
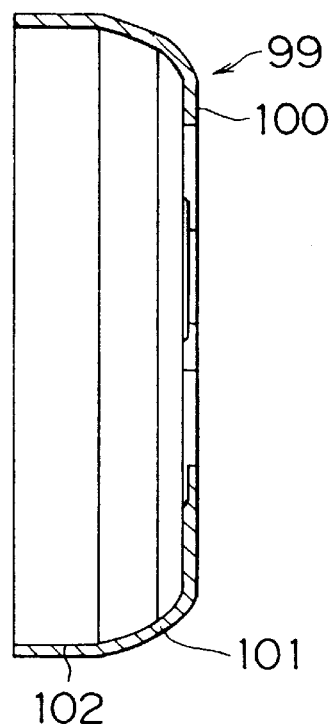
FIG. 6 is a front sectional view showing an oil receiver that forms part of the hydraulic actuator on the side of the secondary pulley shown in FIG. 1.
Figure 7:
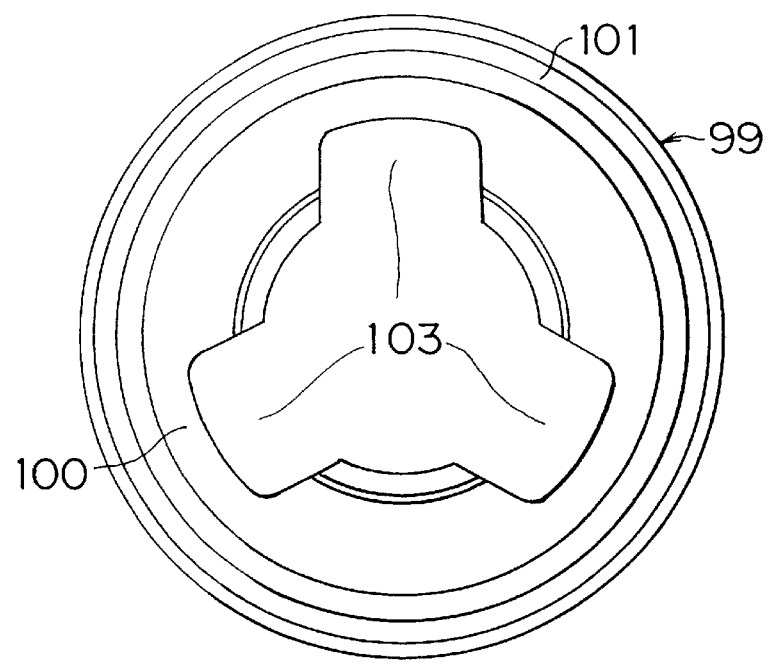
FIG. 7 is a side view showing the oil receiver shown in FIG. 6.

An annular oil receiver 99 made of a metallic material is provided on the outer peripheral side of the secondary shaft 31. FIG. 6 is a sectional view of the oil receiver 99 and FIG. 7 is a side view of the oil receiver 99. The oil receiver 99 is provided with a radial portion 100, a curved portion 101 which is continued to an outer peripheral end of the radial portion 100 and which is curved toward the side of the bulkhead 89, and a cylindrical portion 102 which is continued to the curved portion 101 and which is extended toward the side of the bulkhead 89. The outer diameter of this cylindrical portion 102 is set so as to be smaller than the inner diameter of the balance plate 88. A plurality of cutouts 103 are formed in the radial portion 100 on the inner peripheral end thereof at predetermined intervals in a circumferential direction. The diameter of a circumscribed circle (not shown) of each of the cutouts 103 is set so as to be greater than the diameter of an inscribed circle (not shown) of each of the grooves 98 in the bulkhead 89. The radial portion 100 of the oil receiver 99 is disposed between the bearing 34 and the radial portion 90 of the bulkhead 89.

A nut 104 is tightened and secured on the outer periphery of the secondary shaft 31. With this nut 104 and the stepped portion 31B, the bearing 34, the oil receiver 99, and the bulkhead 89 are held in an axial direction of the secondary shaft 31, and the bearing 34, the oil receiver 99 and the bulkhead 89 are secured in position in the axial direction of the secondary shaft 31. The oil receiver 99, which is positioned and secured in this manner, is disposed at almost the same position in the axial direction as the oil passage 81 of the secondary shaft 31. That is, the opening in the oil passage 81 is disposed so as to face the cutouts 103. Assuming that at least one of the cutouts 103 is projected in the axial direction, at least one of the grooves 98 in the bulkhead 89 is located within the projected zone. Furthermore, when the bulkhead 89 is positioned and secured in the axial direction, an elastic force of the compression coil spring 96 acts on the movable sheave 43 in the axial direction, pressing the movable sheave 43 toward the side of the fixed sheave 42.

A second hydraulic chamber 105 is formed in an annular space enclosed by the bulkhead 89, the outer cylindrical portion 84 of the movable sheave 43, and the balance plate 88. The oil passage 81 is connected to the cutouts 103 in the oil receiver 99, and the cutouts 103 are connected to the grooves 98 in the bulkhead 89. Furthermore, the grooves 98 are connected to the second hydraulic chamber 105 by way of an oil passage 106 between the cylindrical portion 91 and the oil receiver 99. The first hydraulic chamber 95, the second hydraulic chamber 105, compression coil spring 96, bulkhead 89, balance plate 88, oil receiver 99 and so forth make up the hydraulic actuator 45.

The secondary shaft 31 corresponds to the rotary member of the invention; the secondary pulley 37 having the fixed sheave 42 and the movable sheave 43 corresponds to the power transmitting member of the invention; the oil receiver 99 corresponds to the oil passage forming member of the invention; the bulkhead 89 and the bearing 34 correspond to the parts of the invention; the cutouts 103 correspond to the grooved portion of the invention; and the second hydraulic chamber 105 corresponds to the oil chamber of the invention.

An example of control content of a vehicle of this configuration will hereinafter be described. The forward-reverse selection mechanism 8 is controlled based on operation of the shift position selection unit 69A. When a forward position is selected, the forward clutch CR is engaged and the reverse brake BR is released, which results in the input shaft 11 being directly connected to the primary shaft 30. When the torque (or power) of the engine 1 is transmitted via the torque converter 7 to the input shaft 11 in this state, the input shaft 11, carrier 29 and the primary shaft 30 turn integrally. The torque of the primary shaft 30 is transmitted via the primary pulley 36, the belt 46 and the secondary pulley 37 to the secondary shaft 31.

The torque transmitted to the secondary shaft 31 is transmitted to the intermediate shaft 50 by way of the counter drive gear 47 and the counter driven gear 53. The torque transmitted to the intermediate shaft 50 is transmitted to the differential case 55 by way of the final drive gear 54 and the ring gear 58. When the differential case 55 turns, its torque is transmitted to the drive shaft 62 by way of the pinion gear 60 and the side gear 61, and then transmitted to the wheel 63.

When the reverse position is selected, on the other hand, the forward clutch CR is disengaged and the reverse brake BR is engaged, thus locking the ring gear 26. Then, as the input shaft 11 turns, the pinion gears 27 and 28 revolve while they rotate on their own axes. The carrier then rotates in a direction opposite the direction of rotation of the input shaft 11. As a result, the primary shaft 30, secondary shaft 31, intermediate shaft 50, and so forth rotate in a direction opposite that of when a forward position is selected, allowing the vehicle to move in reverse.

The gear ratio of the continuously variable belt transmission 9 is controlled so that the operating conditions of the engine 1 may be optimized based on vehicle acceleration requirements evaluated with the vehicle speed, accelerator opening, and other conditions (namely, drive power requirements), data stored in the electronic control unit 64 (for example, an optimum fuel consumption curve having the engine speed and throttle opening as parameters), and other factors. To be more specific, the width of the groove 40 in the primary pulley 36 is varied by controlling the hydraulic pressure of the hydraulic chamber of the hydraulic actuator 41. As a result, the winding radius of the belt 4 of the primary pulley 36 is changed, which means that the ratio of the input speed to the output speed of the continuously variable belt transmission 9, namely the gear ratio, is controlled steplessly (continuously).

The width of the groove 44 in the secondary pulley 37 is varied by controlling the hydraulic pressure of the first hydraulic chamber 95 of the hydraulic actuator 45. That is, a pinching pressure (or a holding force) on the belt 31 in an axial direction of the secondary pulley 37 is controlled. This pinching pressure controls a tension in the belt 31 and a contact surface pressure between the primary pulley 36 and the belt 31, as well as between the secondary pulley 37 and the belt 31. The hydraulic pressure of the first hydraulic chamber 95 is controlled based on the torque input to the continuously variable belt transmission 9, the gear ratio of the continuously variable belt transmission 9, and the like. The torque applied to the continuously variable belt transmission 9 is evaluated based on the engine speed, throttle opening, and torque ratio of the torque converter 7, and the like. Furthermore, since the movable sheave 43 is pressed toward the side of the fixed sheave 42 by a pressing force of the compression coil spring 96, the target hydraulic pressure of the first hydraulic chamber 95 is set in consideration of the pressing force of the compression coil spring 96.

When a centrifugal force is produced from the rotation of the secondary shaft 31, a centrifugal hydraulic pressure acts on the first hydraulic chamber 95 and consequently the hydraulic pressure of the first hydraulic chamber 95 increases to a level higher than the hydraulic pressure as controlled by the hydraulic pressure control unit 77. As a result, the pressing force with which the movable sheave 43 is pressed toward the side of the fixed sheave 42 might become higher than a target value corresponding to the torque to be transmitted. The first hydraulic chamber 95 and the second hydraulic chamber 105, however, are formed by the bulkhead 89, and so the centrifugal hydraulic pressure also acts on the second hydraulic chamber 105. When this happens, the hydraulic pressure in the second hydraulic chamber 105 acts on the balance plate 88, generating a pressing force that presses the movable sheave 43 axially in a direction away from the fixed sheave 42. As a result, the centrifugal hydraulic pressure acting on the first hydraulic chamber 95 and the centrifugal hydraulic pressure acting on the second hydraulic chamber 105 cancel each other out. This results in a pressing force acting in the axial direction that corresponds to the hydraulic pressure as controlled by the hydraulic pressure control unit 77 acting on the movable sheave 43. Tension in the belt 46 can therefore be prevented from increasing to an unexpectedly high level.

In this embodiment, part of a connecting oil passage that connects the oil passages 78 and 81 and the second hydraulic chamber 105 is formed by the cutouts 103 in the oil receiver 99. This allows the connecting oil passage to be formed so as to bypass the bearing 34 and the bulkhead 89 provided on both sides in the axial direction of the oil receiver 99 and, furthermore, obviates the need to provide parts for exclusive use in forming the connecting oil passage. This helps prevent the number of parts used in the hydraulic actuator 45, as well as the weight of the hydraulic actuator, from increasing. It further prevents an increase in space needed for mounting parts on the secondary shaft 31 in the axial direction. This makes it possible to build the continuously variable belt transmission 9 more compact in the axial direction, thus contributing to a greater vehicle mountability of the continuously variable belt transmission 9.

It is also possible to form a through-hole (not shown) in the radial portion 100 of the oil receiver 99 through the radial portion 100, in an axial direction (a depth direction) and, by this hole, to form a grooved portion connecting the oil passages 79 and 81 and the second hydraulic chamber 105. It is also possible to form a groove (not shown) or a recessed portion (not shown) in a side face of the oil receiver 99 on the side of the bulkhead 89 which may be used to form a grooved portion connecting the oil passages 79 and 81 and the second hydraulic chamber 105.

Figure 8:
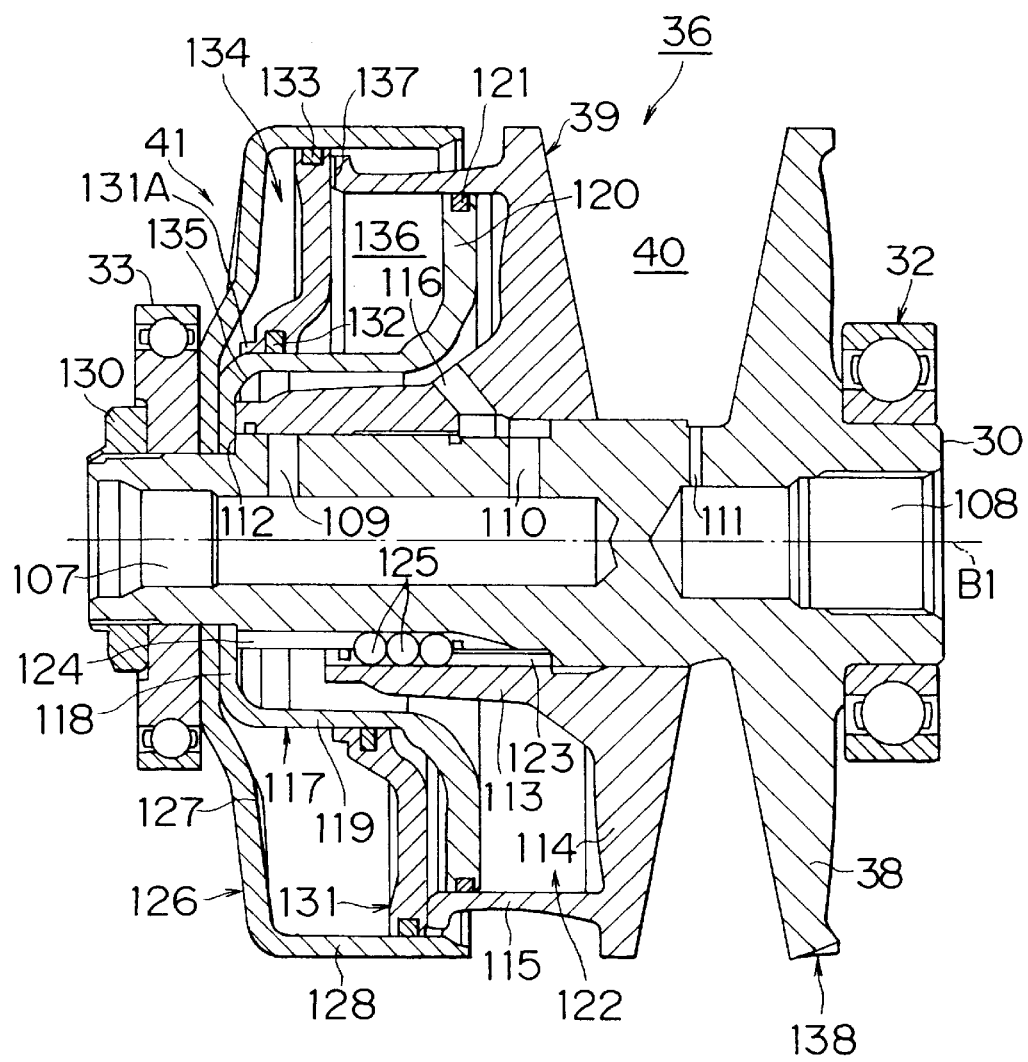
FIG. 8 is a front sectional view showing the construction of the area near the primary pulley shown in FIG. 2.

FIG. 8 is an enlarged sectional view showing the area near the primary pulley 36. The primary pulley 36 is mounted on the outer periphery of the primary shaft 30, disposed between the bearing 33 installed in the transaxle rear cover 6 and the bearing 32 installed on the side of the transaxle case 5. The primary shaft 30 is rotatable about the axis B1, and two oil passages 107 and 108 are formed inside the primary shaft 30 in the axial direction thereof. These two oil passages 107 and 108 are connected to a hydraulic circuit of the hydraulic pressure control unit 77. Oil passages 109 and 110 are provided to extend radially from the outer peripheral surface of the primary shaft 30 and to connect to the oil passage 107. The oil passage 109 and the oil passage 110 are provided at different locations along the axial direction. More precisely, the oil passage 109 is located closer to the bearing 33 than the oil passage 110. An oil passage 111 is also provided to extend radially from the outer peripheral surface of the primary shaft 30 and to connect to the oil passage 108. The oil passage 111 is open to an area between the movable sheave 39 and the fixed sheave 38. The oil passage 111 functions to supply oil to lubricate the belt 36.

A stepped portion 112 is formed on the outer periphery of the primary shaft 30 between the opening in the oil passage 109 and the bearing 33. The stepped portion 112 faces the bearing 33. The movable sheave 39 is provided with an inner cylindrical portion 113 which slides along the outer peripheral surface of the primary shaft 30, a radial portion 114 which is continued from the end of the inner cylindrical portion 113 on the side of the fixed sheave 38 toward the side of the outer periphery, and an outer cylindrical portion 115 which is continued to the outer peripheral end of the radial portion 114 and which is extended in an axial direction toward the bearing 33. An oil passage 116 is formed in the inner cylindrical portion 113, passing through from the inner peripheral surface thereof to the outer peripheral surface. This oil passage 116 is connected to the oil passage 110.

A bulkhead 117 is disposed between the movable sheave 39 and the bearing 33. The bulkhead 117 is provided with a radial portion 118 which forms an inner peripheral side of the bulkhead 117, a cylindrical portion 119 which is continued to an outer peripheral end of the radial portion 118 and which is extended axially toward the side of the radial portion 114, and a radial portion 120 which is continued to an end of the cylindrical portion 119 on the side of the radial portion 114 and which is extended outward. The radial portion 118 of the bulkhead 117 is disposed between the stepped portion 112 and the bearing 33. A plastic seal ring 121 is attached on an outer peripheral end of the bulkhead 117. The seal ring 121 makes contact with an inner peripheral surface of the outer cylindrical portion 115 of the movable sheave 39 so as to permit relative movement in an axial direction, and a sealing surface is formed between the portions of contact. A third hydraulic chamber 122 is formed in this manner in a space enclosed by the movable sheave 39 and the bulkhead 117. The third hydraulic chamber 122 is connected to the oil passage 116.

A groove 123 is formed in an inner peripheral surface of the inner cylindrical portion 113 in an axial direction, and a groove 124 is formed in an outer peripheral surface of the primary shaft 30 in an axial direction. A plurality of the grooves 123 and 124 are formed at predetermined intervals along a circumferential direction. The primary shaft 30 and the movable sheave 39 are positioned so that each of the grooves 123 and each of the grooves 124 are in phase with each other along the circumferential direction. A plurality of balls 125 are placed to run through both of the grooves 123 and 124. The grooves 123 and 124 and balls 125 allow relative movement between the primary shaft 30 and the movable sheave 39 in an axial direction, while preventing relative movement between the primary shaft 30 and the movable sheave 39 in a circumferential direction.

Figure 9:
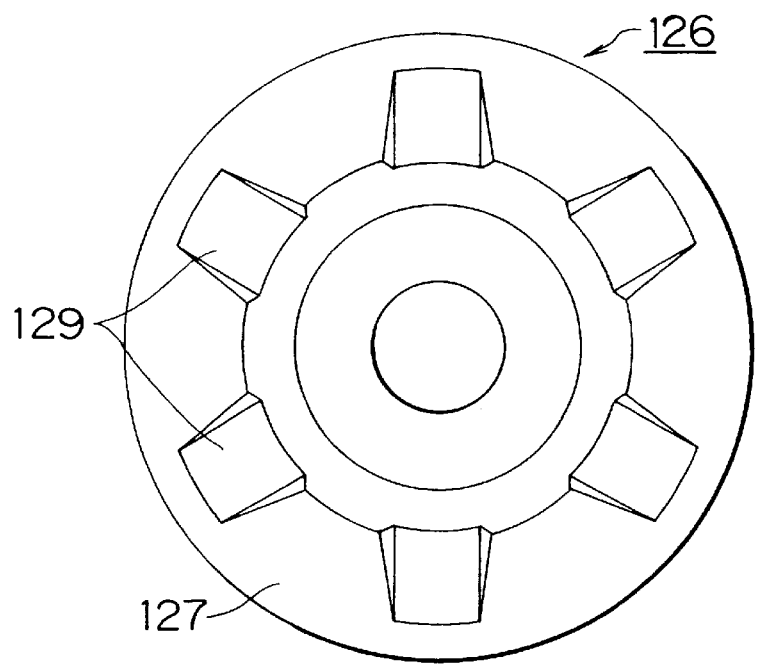
FIG. 9 is a side view showing a cylinder that forms part of the hydraulic actuator on the side of the primary pulley shown in FIG. 8.

An annular cylinder 126 is mounted on the outer periphery of the primary shaft 30. The cylinder 126 is provided with a radial portion 127, and a cylindrical portion 128 which is continued to an outer peripheral end of the radial portion 127 and which is extended in an axial direction toward the side of the fixed sheave 38. The inside diameter of the cylindrical portion 128 is set so as to be greater than the outside diameter of the cylindrical portion 115 of the movable sheave 39. FIG. 9 is a side view of the annular cylinder 126. A plurality of reinforcement ribs 129 protruding in an axial direction are formed at predetermined intervals along a circumferential direction on a side face of the radial portion 127 of the annular cylinder 126 on the side of the bearing 33. The cylinder 126 is of a metallic material such as a machined and processed rolled steel sheet. Possible machining methods include stamping, forging and cutting.

An inner peripheral portion of the radial portion 127 of the cylinder 126 is disposed between the bearing 33 and the radial portion 118 of the bulkhead 117. A nut 130 is tightened and secured on the outer periphery of the primary shaft 30. With this nut 130 and the stepped portion 112, the bearing 33, the cylinder 126, and the bulkhead 117 are held in an axial direction of the primary shaft 30, and the bearing 33, the cylinder 126 and the bulkhead 117 are secured in position in the axial direction of the primary shaft 30.

A piston 131 is provided between the cylindrical portion 119 of the bulkhead 117 and the cylindrical portion 128 of the cylinder 126, and between the radial portion 127 of the cylinder 126 and the outer cylindrical portion 115 of the movable sheave 39. This piston 131 is of a disk shape. An O-ring 132 of a rubber elastic material is attached to an inner periphery of the piston 131 and a plastic seal ring 133 is fitted to an outer periphery of the piston 131. The piston 131, the bulkhead 117 and the cylinder 126 are movable in an axial direction. The O-ring 132 makes contact with an outer peripheral surface of the cylindrical portion 119 of the bulkhead 117 to form a sealing surface. In addition, a sleeve 131A of a cylindrical shape is formed on an inner peripheral end of the piston 131 in an axial direction, while extending toward the side of the bearing 33.

A fourth hydraulic chamber 134 is in this manner formed in an annular space enclosed by the cylinder 126, the bulkhead 117, and the piston 131. An oil passage 135 passing through the bulkhead 117 in a depth direction is formed at a boundary portion between the radial portion 118 and the cylindrical portion 119 of the bulkhead 117. The third hydraulic chamber 122 and the fourth hydraulic chamber 134 are connected with the oil passage 135. An air chamber 136 is formed in a space enclosed by the bulkhead 117, piston 131, and the outer cylindrical portion 115 of the movable sheave 39. An air passage 137 is provided communicating the air chamber 136 and the cylinder 126 to the outside.

Figure 10:
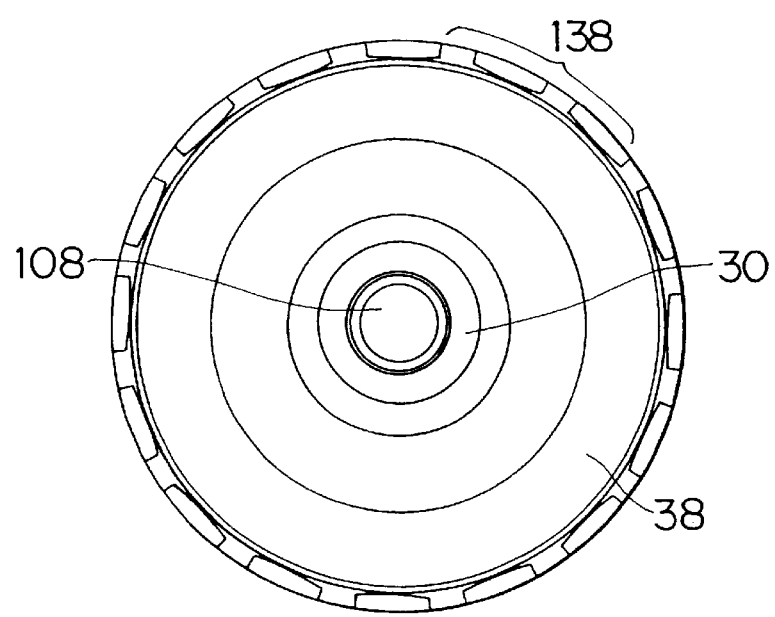
FIG. 10 is a side view showing a cylinder that forms part of the fixed sheave on the side of the primary pulley shown in FIG. 8.

FIG. 10 is a side view showing the primary shaft 30 from the end of the forward-reverse selection mechanism 8. External teeth 138 that comprise recessed portions and protruding portions arranged alternately in a circumferential direction are provided on an outer periphery of the fixed sheave 38. These external teeth 138 are provided to allow the input speed sensor 70 to detect the speed of the primary shaft 30. The external teeth 138 are of a metallic material cut with a cutter of a hobbing machine (not shown). The hobbing machine may also be used to cut the counter drive gear 47. The output speed sensor 71 is constructed so as to output a detection signal based on the rotational state of the counter drive gear 47. The hydraulic actuator 41 is made up of the third hydraulic chamber 122, fourth hydraulic chamber 134, cylinder 126, piston 131, bulkhead 117, oil passages 116 and 135 and so forth as constructed in a manner described above.

Control and operations of the primary pulley 36 and the hydraulic actuator 41 of the continuously variable belt transmission 9 will hereinafter be described in detail. When hydraulic pressure is discharged from the third hydraulic chamber 122 and the fourth hydraulic chamber 134 by way of the oil passages 116 and 110, the movable sheave 39 and the piston 131 are pressed toward the side of the bearing 33 by a tension applied to the belt 36. This state is depicted on the upper half side above axis B1 shown in FIG. 8. Since the movable sheave 39 is located at an outer peripheral side of the oil passage 109 in this state, the oil passage 109 is cut off from the fourth hydraulic chamber 134.

From this state, when hydraulic pressure is supplied through the oil passage 110 to the third hydraulic chamber 122 and the fourth hydraulic chamber 134 and builds up therein, the hydraulic pressure in the third hydraulic chamber 122 is directly transmitted to the movable sheave 39 and the hydraulic pressure in the fourth hydraulic chamber 134 is transmitted to the movable sheave 39 through the piston 131, thus pressing the movable sheave 39 in an axial direction toward the side of the fixed sheave 38. As the movable sheave 39 moves to open the oil passage 109, hydraulic pressure is supplied to the third hydraulic chamber 122 and the fourth hydraulic chamber 134 through the oil passage 109. The width of the groove 40 in the primary pulley 36 is narrowed in this manner.

The width of the groove 40 is controlled based on the tension applied to the belt 36 and the pressing force as determined through the hydraulic pressure in the third hydraulic chamber 122 and the fourth hydraulic chamber 134. The state depicted in the lower half below the axis B1 shown in FIG. 8 corresponds to a state in which the width of the groove 40 is at its narrowest. When the piston 131 moves toward the side of the fixed sheave 38, air in the air chamber 136 is discharged to the outside of the air chamber 136 through the air passage 137. When the piston 131 moves toward the side of the bearing 33, air outside the air chamber 136 advances into the air chamber 136 through the air passage 137. This ensures smooth movement of the piston 131.

The piston 131 is positioned in a radial direction by the O-ring 132 contacting the cylindrical portion 119 of the bulkhead 117, while the O-ring 133 contacts the cylindrical portion 128 of the cylinder 126. The length of contact in an axial direction between the cylindrical portion 119 of the bulkhead 117 and the inner peripheral surface of the piston 131 is designed to be as long as possible through the sleeve 131A. Namely, it is possible to ensure the longest possible length in an axial direction of a surface of the piston 131 running parallel with the cylindrical portion 119 of the bulkhead 117. This, as a result, prevents the central axis (not shown) of the piston 131 and the central axis (not shown) of the bulkhead 17 from intersecting one another.

Therefore, when the piston 131 moves in an axial direction, more particularly, when the piston 131 moves in the axial direction as a result of a sudden change in the hydraulic pressure in the third hydraulic chamber 122 and the fourth hydraulic chamber 134, an increase in sliding resistance (friction resistance) between the piston 131 and the outer cylindrical portion 126 of the cylinder 136 and between the piston 131 and the cylindrical portion 119 of the bulkhead 117 is controlled such that good operating response of the piston 131 is able to be maintained.

In this embodiment, if a treatment to form a plastic coating layer or a heat treatment to harden surfaces is performed on at least either an inner peripheral surface of the cylindrical portion 128 of the cylinder 126 or an outer peripheral surface of the cylindrical portion 119 of the bulkhead 117, an increase in sliding resistance between the piston 131 and the outer cylindrical portion 126 of the cylinder 136 and between the piston 131 and the cylindrical portion 119 of the bulkhead 117 is even further controlled. It is also possible to form continuously on an inner peripheral end of the piston 131 a sleeve (not shown) that is extended in an axial direction toward the side of the radial portion 120 of the bulkhead 117. In such a configuration, an opposing length between the cylindrical portion 119 of the bulkhead 117 and the inner peripheral surface of the piston 131 is made even longer. It is further possible to form a sleeve (not shown) that is extended in an axial direction on an outer peripheral side of the piston 131. This configuration helps control sliding resistance (friction resistance) contact between the outer periphery of the piston 131 and the cylindrical portion 128 of the cylinder 127.

In this embodiment, reinforcement ribs 129 are used to enhance the strength of the radial portion 127 of the cylinder 126. Even if the hydraulic pressure in the fourth hydraulic chamber 134 should build up to a high level, deformation of the radial portion 127 of the cylinder 126 can be controlled, thus ensuring good operability of the piston 131. To enhance strength of the cylinder 127, part of the cylinder 131 is protruded locally to form reinforcement ribs 129 instead of adopting a thicker wall construction. This helps reduce the manufacturing cost, as well as the weight of the cylinder 126.

Furthermore in this embodiment, the external teeth 138 of the fixed sheave 38 are machined using a hobbing machine. The hobbing machine is also used to cut the counter drive gear 47. The input speed sensor 70 is used to detect the rotational state of the external teeth 138, while the output speed sensor 71 is used to detect the rotational state of the counter drive gear 47. Namely, since the same metal-cutting machine is used and the same cutting method is employed to machine the external teeth 138 and the counter drive gear 47, machining accuracy of the external teeth 138 can be set to the almost same level as that of the counter drive gear 47. Therefore, compared to the case in which the external teeth 138 and the counter drive gear 47 are machined using different metal-cutting machines and by employing different machining methods (for example, manufacturing the external teeth 138 by hot forging, while cutting the counter drive gear 47 using a hobbing machine), the scale of the machining facility can be made smaller and manufacturing costs can be reduced. In addition, it is possible to provide the same detection sensitivity for the input speed sensor 70 and the output speed sensor 71, offering enhanced detection accuracy.

In the embodiment mentioned above, the oil chamber (not shown) provided around the secondary shaft may be one that does not function to cause an axial pressing force to act on the movable sheave; for example, it may be one to which lubricant is supplied. Furthermore, the embodiment may be applicable to a vehicle that uses a power source other than an engine, e.g., a motor. The embodiment may also be applicable to a vehicle that uses an engine and a motor for its power source.

As described heretofore, according to the embodiment, a grooved portion provided in an oil passage forming member itself forms an oil passage that is connected to an oil chamber. As a result, the oil passage forming member can be used to form a grooved portion that bypasses parts, for example, a bearing and a bulkhead provided on both sides of the oil passage forming member in the axial direction thereof, and there is no need to provide a part for exclusive use in forming the grooved portion. This makes it possible to prevent the number of parts disposed around the rotary member, as well as the weight of the rotary member, from increasing. It is also possible to prevent an increase in the space required for mounting parts on the rotary member in the axial direction. Therefore, the continuously variable belt transmission can be built compact in the axial direction thus enhancing vehicle mountability of the continuously variable belt transmission.

What is claimed is:

1. A continuously variable belt transmission comprising:
    a power transmitting member provided on a rotary member, said power transmitting member including a portion movable in an axial direction of said rotary member;
    a belt wound around said power transmitting member;
    a first hydraulic chamber positioned to apply a holding force in said axial direction to said portion of said power transmitting member;
    a second hydraulic chamber positioned to apply a force in said axial direction to said power transmitting member, so as to weaken said holding force;
    a first oil passage provided in said rotary member, through which a hydraulic pressure is supplied to said second hydraulic chamber;
    an oil passage forming member which is mounted to said rotary member, disposed along a path from said first oil passage to said second hydraulic chamber, and provided with a first grooved portion that connects said second hydraulic chamber and said first oil passage, said first grooved portion faces said first oil passage,
    wherein parts attached to said rotary member are disposed on both axial sides of said oil passage forming member.

2. A continuously variable belt transmission according to claim 1, wherein
    said first hydraulic chamber and said second hydraulic chamber are disposed in a space provided around said rotary member,
    said parts include a bulkhead that separates said first hydraulic chamber from said second hydraulic chamber within said space and a bearing that retains said rotary member, and
    said oil passage forming member is held by said bulkhead and said bearing such that said first grooved portion is disposed between said bulkhead and said bearing.

3. A continuously variable belt transmission according to claim 2, wherein
    said bulkhead is provided with a second grooved portion in a side of said bulkhead facing said hydraulic pressure forming member,
    said first grooved portion of said hydraulic pressure forming member is communicated with said second grooved portion of said bulkhead, and
    a hydraulic pressure to said second hydraulic chamber is supplied from said oil passage by way of said first grooved portion and said second grooved portion.

4. A continuously variable belt transmission according to claim 1, wherein said oil passage forming member is held between, and engaged by, said parts attached to said rotary member.

5. A continuously variable belt transmission comprising:
    a rotary member having a first oil passage;
    a belt wound around said rotary member;
    an oil chamber provided around said rotary member;
    a bulkhead attached to said rotary member and disposed so as to face said oil chamber;
    a bearing that supports said rotary member; and
    an oil passage forming member located on an outer periphery of said rotary member and installed between said bearing and said bulkhead, said oil passage forming member being provided with a grooved portion facing said first oil passage to permit fluid communication between said first oil passage and said oil chamber.

6. A continuously variable belt transmission according to claim 5, further comprising:
    a second oil passage provided in said rotary member and connected to said first oil passage,
    wherein said grooved portion is formed in said oil passage forming member so as to face said second oil passage.

7. A continuously variable belt transmission according to claim 5, wherein said oil passage forming member is held between, and engaged by, said bearing and said bulkhead.

* * * * *